United States Patent
Goodrich et al.

(10) Patent No.: US 11,034,120 B1
(45) Date of Patent: Jun. 15, 2021

(54) TOOLING METHOD FOR EXPANDED SLIT SHEET MATERIAL

(71) Applicants: David Paul Goodrich, Sedona, AZ (US); Sheldon H. Parker, Lecanto, FL (US)

(72) Inventors: David Paul Goodrich, Sedona, AZ (US); Sheldon H. Parker, Lecanto, FL (US)

( * ) Notice: Subject to any disclaimer, the term of this patent is extended or adjusted under 35 U.S.C. 154(b) by 115 days.

(21) Appl. No.: 16/212,536

(22) Filed: Dec. 6, 2018

Related U.S. Application Data

(60) Provisional application No. 62/595,473, filed on Dec. 6, 2017.

(51) Int. Cl.

| | | |
|---|---|---|
| B32B 3/24 | (2006.01) | |
| B31D 5/00 | (2017.01) | |
| B31D 3/00 | (2017.01) | |
| B31D 3/04 | (2006.01) | |
| B32B 3/12 | (2006.01) | |
| B32B 3/26 | (2006.01) | |
| B32B 29/00 | (2006.01) | |
| B31D 1/00 | (2017.01) | |
| B65D 85/30 | (2006.01) | |
| B65D 65/02 | (2006.01) | |
| B65D 81/02 | (2006.01) | |
| B65D 81/03 | (2006.01) | |

(52) U.S. Cl.
CPC ......... *B31D 5/0013* (2013.01); *B31D 1/0031* (2013.01); *B31D 3/007* (2013.01); *B31D 3/04* (2013.01); *B31D 5/0065* (2013.01); *B32B 3/12* (2013.01); *B32B 3/266* (2013.01); *B32B 29/005* (2013.01); *B31D 2205/0023* (2013.01); *B31D 2205/0052* (2013.01); *B31D 2205/0064* (2013.01); *B32B 2250/02* (2013.01); *B32B 2553/00* (2013.01); *B65D 65/02* (2013.01); *B65D 65/44* (2013.01); *B65D 81/03* (2013.01); *B65D 85/30* (2013.01)

(58) Field of Classification Search
CPC ............................ B31D 1/0031; B31D 5/0065
USPC ........................................... 83/854, 332, 686
See application file for complete search history.

(56) References Cited

U.S. PATENT DOCUMENTS

| | | | | |
|---|---|---|---|---|
| 5,365,819 | A * | 11/1994 | Maida | B21D 31/04 |
| | | | | 493/363 |
| 5,782,735 | A * | 7/1998 | Goodrich | B31D 1/0031 |
| | | | | 225/100 |
| 10,226,907 | B2 * | 3/2019 | Goodrich | B32B 29/005 |

\* cited by examiner

*Primary Examiner* — William P Watkins, III

(74) *Attorney, Agent, or Firm* — Westerman, Hattori, Daniels & Adrian, LLP

(57) ABSTRACT

The present invention discloses a method of producing at least a pair of interlocking adjacent layers of a paper packaging product, the pair of interlocking adjacent layers being formed of a sheet of slit paper having a slit pattern, the slit pattern upon expansion, forming cells that include land regions that are inclined with respect to a plane of an unexpanded sheet. The method comprises slitting the sheet of slit paper with beveled blades that have a first wedge angle on one side of the blades and a second wedge angle on the other side of the blades, wherein the first wedge angle is wider than the second wedge angle to produce slits that upon expansion, produce the lands regions that have angles of inclination in a range for 50 to 85 degrees.

22 Claims, 4 Drawing Sheets

TOOLING METHOD FOR EXPANDED SLIT SHEET MATERIAL

This application claims priority to U.S. Provisional Application No. 62/595,473, "TOOLING METHOD FOR EXPANDED SLIT SHEET MATERIAL," filed Dec. 6, 2017, which application is incorporated by reference herein in its entirety.

CROSS-REFERENCE TO RELATED APPLICATIONS

This application references patent applications, U.S. patent application Ser. No. 14/480,319 filed Sep. 8, 2014 and Ser. No. 15/820,514 filed Nov. 22, 2017, the disclosures of which are incorporated by reference in their entirety, referenced and recited herein as if in full as part of the description of the present invention.

BACKGROUND OF THE INVENTION

Field of the Invention

This invention provides a method for manufacturing expanded slit sheet material that selectively regulates the production of uniformly opening cells or erratically opened cells.

The Background Art

The expanded slit paper prior art disclosed in U.S. Pat. Nos. 5,538,778, 5,667,871, 5,688,578, and 5,782,735, are incorporated by reference in their entirety, referenced, and recited herein as if in full as part of the description of the present invention. The prior art consists of layering a wrapping comprising a combination of a tissue interleave sheet and an expanded slit sheet for the purposes of cushioning fragile items for shipment. The prior art also relates to a method of expanding the slit sheet material using an electrically powered apparatus.

BRIEF SUMMARY OF THE INVENTION

A main object of the present invention is to overcome the shortcomings of the prior art.

In accordance with some embodiments of the invention, a method of producing at least a pair of interlocking adjacent layers of a paper packaging product, the pair of interlocking adjacent layers being formed of a sheet of slit paper having a slit pattern, the slit pattern upon expansion, forming cells that include land regions that are inclined with respect to a plane of an unexpanded sheet, the method comprising the step of: slitting the sheet of slit paper with beveled blades that have a first wedge angle on one side of the blades and a second wedge angle on the other side of the blades, wherein the first wedge angle is wider than the second wedge angle to produce slits that upon expansion, produce the lands regions that have angles of inclination in a range for 50 to 85 degrees.

In accordance with some embodiments of the invention, the method of producing at least a pair of interlocking adjacent layers of a paper packaging product, the method further comprising the step of: forming the slit pattern by slitting with the blades against a rotating anvil, the blades having an included angle, wherein the paper is recycled paper.

In accordance with some embodiments of the invention, the method of producing at least a pair of interlocking adjacent layers of a paper packaging product, wherein the first wedge angle is in the range from about 40 to 50 degrees, and the second wedge angle is in the range from about 25 to 35 degrees with respect to a center line of the blades.

In accordance with some embodiments of the invention, the method of producing at least a pair of interlocking adjacent layers of a paper packaging product, wherein the first wedge angle is in the range from about 40 to 45 degrees, and the second wedge angle is in the range from about 30 to 35 degrees with respect to a center line of the blades.

In accordance with some embodiments of the invention, the method of producing at least a pair of interlocking adjacent layers of a paper packaging product, wherein a difference between the first wedge angle and the second wedge angle is at least 10 degrees.

In accordance with some embodiments of the invention, the method of producing at least a pair of interlocking adjacent layers of a paper packaging product, wherein the second wedge angle is at least 25 degrees.

In accordance with some embodiments of the invention, an apparatus for at least a pair of interlocking adjacent layers of a paper packaging product, the pair of interlocking adjacent layers being formed of a sheet of slit paper, the sheet of slit paper having a slit pattern, the slit pattern upon expansion, forming cells that include land regions that are inclined with respect to a plane of an unexpanded sheet, the apparatus comprising: a first means for slitting the sheet of slit paper with beveled blades that have a first wedge angle on one side of the blades and a second wedge angle on the other side of the blades, wherein the first wedge angle is wider than the second wedge angle to produce slits that upon expansion, produce the lands regions that have angles of inclination in a range for 50 to 85 degrees.

In accordance with some embodiments of the invention, the apparatus for at least a pair of interlocking adjacent layers of a paper packaging product, the apparatus further comprising: a second means for forming the slit pattern by slitting with the blades against a rotating anvil, the blades having an included angle, wherein the paper is recycled paper.

In accordance with some embodiments of the invention, the apparatus for at least a pair of interlocking adjacent layers of a paper packaging product, wherein the first wedge angle is in the range from about 40 to 50 degrees, and the second wedge angle is in the range from about 25 to 35 degrees with respect to a center line of the blades.

In accordance with some embodiments of the invention, the apparatus for at least a pair of interlocking adjacent layers of a paper packaging product, wherein the first wedge angle is in the range from about 40 to 45 degrees, and the second wedge angle is in the range from about 30 to 35 degrees with respect to a center line of the blades.

In accordance with some embodiments of the invention, the apparatus for at least a pair of interlocking adjacent layers of a paper packaging product, wherein a difference between the first wedge angle and the second wedge angle is at least 10 degrees.

In accordance with some embodiments of the invention, the apparatus for at least a pair of interlocking adjacent layers of a paper packaging product according to claim 7, wherein the second wedge angle is at least 25 degrees.

BRIEF DESCRIPTION OF THE DRAWINGS

The preferred embodiments of the present invention will be described with reference to the accompanying drawings, in which.

DETAILED DESCRIPTION OF THE PREFERRED EMBODIMENTS

Figure 1:
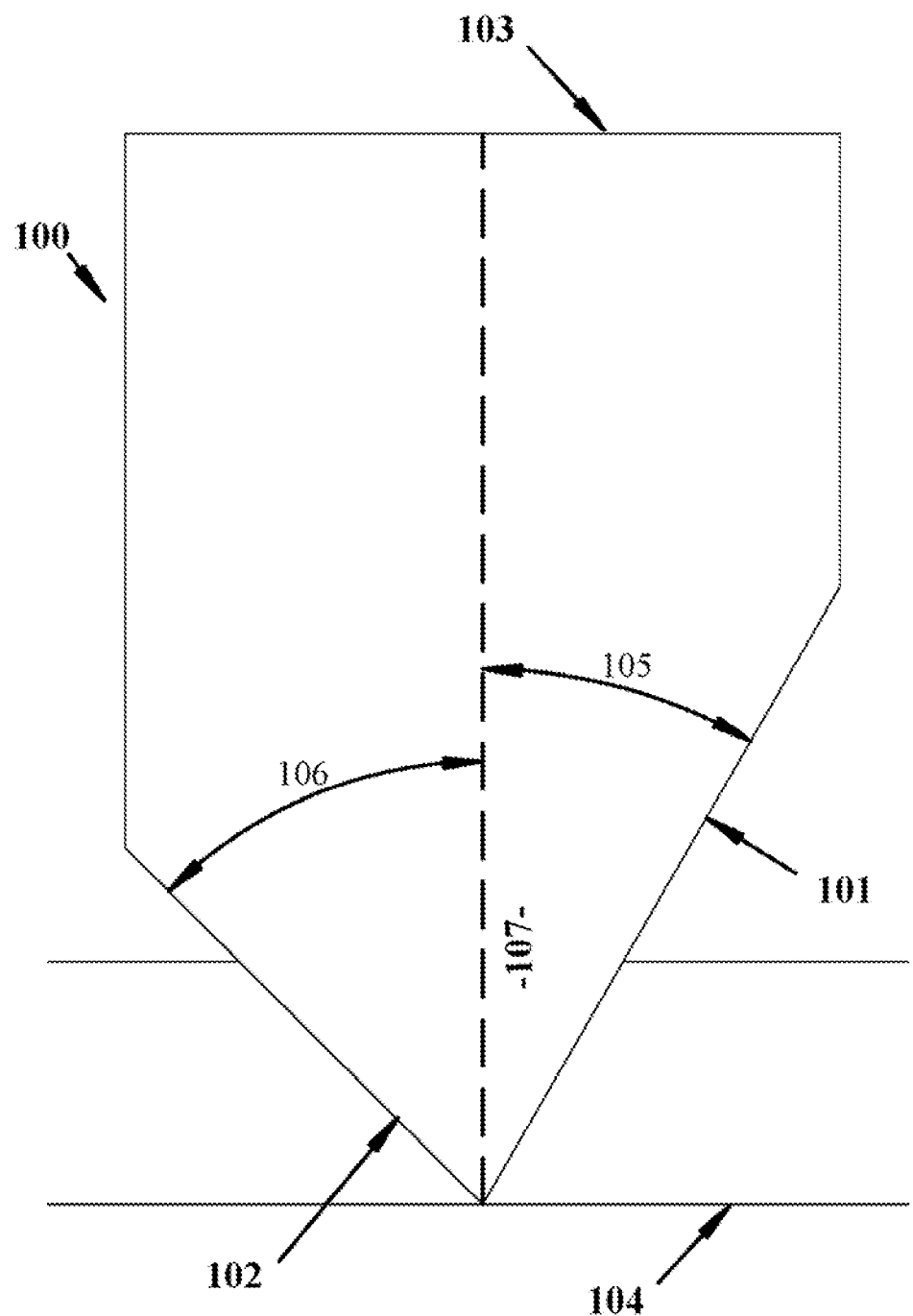
FIG. 1 is a line drawing of a center bevel cutting blade.

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Definitions

Where the definition of terms departs from the commonly used meaning of the term, applicant intends to utilize the definitions provided below, unless specifically indicated otherwise.

For the purposes of the present invention, the term "slit sheet material" refers to the use of offset rows of slits that form a hexagonal, or the like, three dimensional paper material that is flexible and can form to the shape of an item needing wrapping.

For the purposes of the present invention, the term "cell" means the hollow three dimensional shapes that are created when the slit sheet material is expanded longitudinally.

For the purposes of the present invention, the term "lead wall" means the part of the cell that is the full height of the hexagonal shape created from the expansion of the slit sheet material.

For the purposes of the present invention, the term "angle of inclination" means the angle that the land areas of cells form with respect to the plane of the unexpanded slit sheets, wherein the cells have land areas that are inclined relative to unexpanded sheets, and wherein the angle of inclination of one of the adjacent expanded sheets is the mirror image of the angle of inclination of the other expanded sheet.

For the purposes of the present invention, the term "connecting wall" means the part of the cell that is half the height of the cell created from the expansion of the slit sheet material.

For the purposes of the present invention, the term "cell size" means the open space dimension created when expanding the slit sheet material.

For the purposes of the present invention, the term "slit row spacing" means the distance between the rows of slit and un-slit patterns within the slit sheet material.

For the purposes of the present invention, the term "Kraft paper" means the industry name of paper that is measured in weight for every three thousand square feet of material. Thus the weight of 50# Kraft Paper would be the weight of 3000 square feet of paper.

For the purposes of the present invention, the term "basis weight" means the specification relating to paper that measures the weight of a certain square foot area of paper. Thus the basis weight of 3000 square feet of Kraft Paper weighing 50 pounds equals a 50# basis weight. The basis weight of Tissue paper is based on 2,880 square feet.

For the purposes of the present invention, the term "recycled paper" means material that is substantially made from recycled paper in the 90% range or more and is paper that has been returned to the manufacturing process, having once or more been made into a paper product, and remade into a paper sheet.

For the purposes of the present invention, the term "paper fibers" are the individual component of paper that makes up a paper sheet.

For the purposes of the present invention, the term "nesting" means the grouping of cells onto or into one other such that an upper slit sheet material cell can fit within the lower slit sheet material cell to the point at which the thickness gain is not substantial.

For the purposes of the present invention, the term "interlocking" means the grouping of cells onto or into one another is such that an upper slit sheet material cell can nest within the lower slit sheet material cell only to the point at which the average thickness gain of two layers is no less than 70% of the thickness of both layers of a two layer pair and preferably, no less than 80% of the thickness of both layers of a two layer pair. For example, if each layer is 0.5 inches thick, then the average thickness would be no less than 0.7 inches and preferably no less than 0.8 inches.

For the purposes of the present invention, the term "adjacent" means that two layers are immediately adjoining, that is, one layer overlays the other without intervening space and are touching. Layers that nest or interlock to any degree and having no intervening layers, are accordingly, in contact with each other and therefore adjacent.

For the purposes of the present invention, the term "pattern of cells of expanded sheets" means the cell shape configurations such as hexagonal or oval, and cell dimensions such as leg length or width. The term "pattern" means physical characteristics and dimensions and is not inclusive of decorative or ornamental features of the design of a pattern.

For the purposes of the present invention, the term "average thickness" is employed to indicate that since some nesting may be present in layers of sheet that are within the definition of "interlocking" as employed here, the thickness of two adjacent layers can vary. Average thickness is measured as the sum of the thicknesses measured at a plurality of linear intervals, divided by the number of intervals in the plurality of linear intervals. Thus, if thickness measurements are taken every inch over a length of two feet, then the sum of the measurements divided by 24 equals the average thickness.

For the purposes of the present invention, the term "interlocking adjacent layers" means that layers are nested to an extent that the contact between adjacent layers is sufficient to resist contraction of expanded sheets. When two layers are interlocked, the contraction from expanded to unexpanded due to the paper's memory is restricted because one layer is pulling in a first direction and the second layer is pulling in the opposite direction. The degree of nesting depends upon the rigidity of the paper of each of the two layers, and preferably provides no more than a 10% overlap (nesting) of the layers such that the thickness of the two layers is no less than 90% of the sum of the thickness of each layer.

For the purposes of the present invention, the phrase "paper width after expansion" means the width of the sheet of paper after expansion of the slit paper sheet. The decrease of the width of the sheet of paper after expansion is referred to as "necking down". The "percent of necking down" is the percent decrease in paper width after expansion. Thus, a 25 inch width sheet which necks down to 20 inches would be necked down 20%.

For the purposes of the present invention, the phrase "paper width differential" means the difference in width of two adjacent layers of slip paper sheets. Since different slit patterns will yield different amounts of necking down, the paper width differential prior to the expansion step must be sufficient to yield little or no paper width differential after the expansion step. It should be understood that the sheets of expanded paper can be trimmed down to negate any paper width differential post expansion. However, this would constitute a waste of paper and require an additional step or steps, and accordingly, it is preferable to negate any paper width differential by determining a pre-expansion paper width differential that achieves, in combination with the slit patterns of each of two adjacent sheets, a substantially identical paper widths post expansion.

For the purposes of the present invention, the term "Operator" means the person that operates the machinery that automatically expands the slit sheet material that dispenses the product towards the operator.

For the purposes of the present invention, the term "switch back" means the reversal of the angle of inclination of the land at some point or points along the length of a sheet of expanded slit sheet material. A reversal of the angle of inclination from +60° to −60° (60° to 120°) constitutes a switch back.

For the purposes of the present invention, the term "wedge effect" means the cutting of a slit to form a slit having a substantially greater angled cut along one edge of the slit than the other edge of the slit.

For the purposes of the present invention, the term "soft paper" means the particular grade of paper used for absorbing purposes, such as tissues, drying cloths, paper toweling, napkins and handkerchiefs. While these paper products, unlike their woven fabric counterparts, are typically intended for disposable use, in the present invention soft paper is employed for its soft feel, smooth structure, and good strength in both dry and wet states.

For the purposes of the present invention, the term "erratically opening" as employed herein, means the random, disorderly, disordered, chaotic, scrambled opening of cells of slit paper sheets during expansion of the paper, such that cells of adjacent layers of expanded sheet interlock rather than nest.

DETAILED DESCRIPTION

The new art provides a stronger and longer life solution for manufacturing slit sheet expanded material described in pending U.S. patent application Ser. No. 14/480,319. The disclosures of U.S. patent application Ser. No. 14/480,319 filed Sep. 8, 2014, and Ser. No. 15/001,168 filed Jan. 19, 2016, and Ser. No. 15/820,514 filed Nov. 22, 2017 are incorporated herein by reference in their entirety, and recited herein as if in full as part of the description of the present invention.

Slit Sheet Materials

For the purposes of the present invention, the descriptions of the paper and slit patterns within the embodiment of U.S. Pat. No. 5,667,871 can be used within this application. The material can be as described in the '871 patent, except that the two differently sized slit patterns are employed in the present invention, rather than just the one pattern of the '871 patent. These two slit patterns substantially negate the nesting problem associated with the prior art U.S. Pat. No. 5,667,871.

Further information relating to the paper which can be used in the present invention, sit patterns, and the expansion process is found in U.S. Pat. Nos. 5,538,778, 5,667,871, 5,688,578, and 5,782,735, the disclosures of which are incorporated by reference herein, as though recited in full.

Each slit pattern will require varying paper strength and thickness to perfect its crush strength and ease of stretching within the automated expander.

The slit pattern dimensions set forth below are one example of the composite products from the two or more varying slit sheet materials. There are a number of slit sheet variations that will work to inhibit nesting and the specific dimensions and shapes created below should not limit the patterns that can be used to make the new art. The critical feature is that the slit patterns of adjacent layers differ in slit length, spacing between slits in a row, and/or the spacing between rows of slits.

The paper used to manufacture the slit sheet material is preferred to be recycled and is in the range of 30-80 pounds in basis weight dependent upon the cell size of the slit sheet expanded material. Virgin paper has longer fibers and will produce a firmer product with equivalent basis weight as recycled paper. Again, depending on the cushioning required one may use a 30 pound recycled paper to obtain a very soft cushion and alternating between recycled and virgin as the paper weight goes up fine tunes the cushioning effect. Additionally, a soft cushion recycled paper can be used for one sheet of the pair of sheets and the other can be a higher weight recycled paper or virgin paper. Kraft paper is manufactured according to the Tappi T-410 (standard of 3,000 Square feet of material per basis weight. As an example a Kraft paper with a basis weight of 40 means that 3,000 square feet will weigh 40 pounds. Interestingly the paper is about 0.004 inches thick but this can vary based on crushing methods to produce different surfaces.

In the case of a cushioning product made from Kraft paper the ideal paper weight, depending on the cushioning requirements is 30 to 90 pounds.

It is preferred to use the slit pattern that is approximately three-to-one in size between the length of the slit portion and the un-slit portion of the slit sheet material. In this instance a ½" slit portion followed by a ³⁄₁₆" un-slit portion is a preferred pattern in the first row. Each row is ⅛" apart and bisects or is transverse to the direction of manufacturing the slit sheet material. Each slit pattern row below is offset to the above pattern such that the slit portion bisects the unslit pattern of the upper row and so forth. This alternating pattern enables the paper to be expanded in to the web of hexagonal, diamond, square, or round shaped three dimensional cells that are created dependent upon the specific slit pattern. A hexagonal pattern is created with the approximate three-to-one slit to unslit lengths. It has been established that the hexagonal shape is the strongest of all the cell shapes and therefore is the preferred embodiment to the new art. There are exceptions when a softer cushioning material is required where one of the slit sheet materials is a hexagonal layer with the adjoining layer slit sheet designed to be a square. In this instance the preferred embodiment is for both layers to substantially create hexagonal cells.

The second layer of slit sheet material will be of the same three dimensional thickness. The thickness can be created from the spacing of the rows. In this instance the spacing is ⅛" thus creating ¼" long cells. Because these cells can only rotate short of 90 degrees toward a vertical orientation, the total height is approximately 3/16" overall. The lead wall of the cell is the portion of the cell that makes up the full depth of the slit sheet when expanded. There are two lead walls created no matter what shape the cells create or slit pattern used. These two lead walls face the direction of manufacture and the surface area is made up of the un-slit area within the row and the space between the rows times 2. The depth of the lead wall can also be described as the unslit space between every other set of rows or between the first and third rows.

The overall height of the expanded slit sheet material can also be described as a series of rows such that the first row of slits at position "0" is followed by its offset un-slit portion of the row underneath at position 1/8" below and not until the third row appears and the offset again places a slit at position 1/4", thereby creating a total height of 1/4" for the lead walls of the hexagonal cell.

Figure 4:
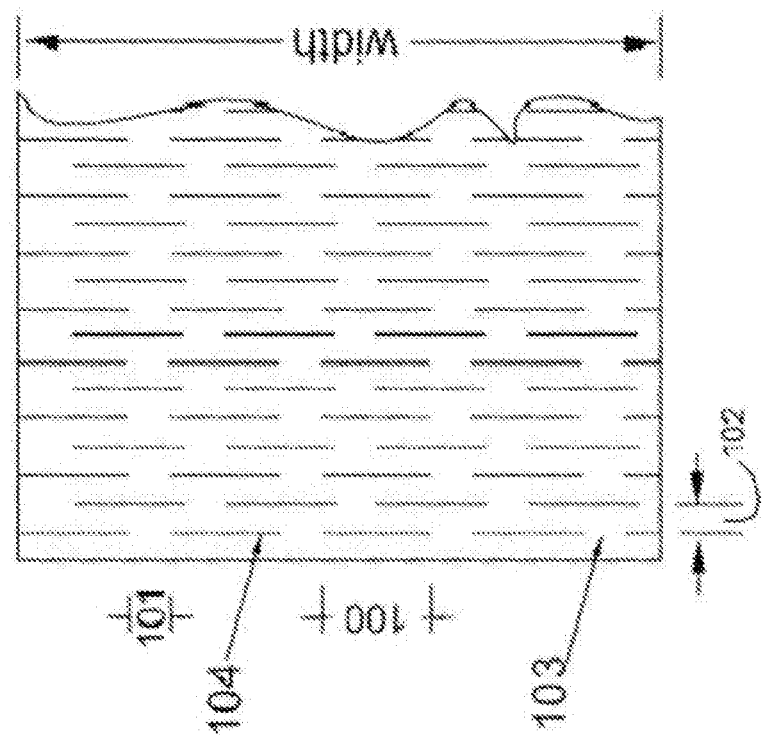
FIG. 4 is a top view of one of the layers of unexpanded slit sheet paper material.

FIG. 4 is the top view of one layer of the slit paper prior to expansion with 100 being the width of the slit and 101 being width of the unslit dimension. 102 is the distance between the rows.

Figure 5:
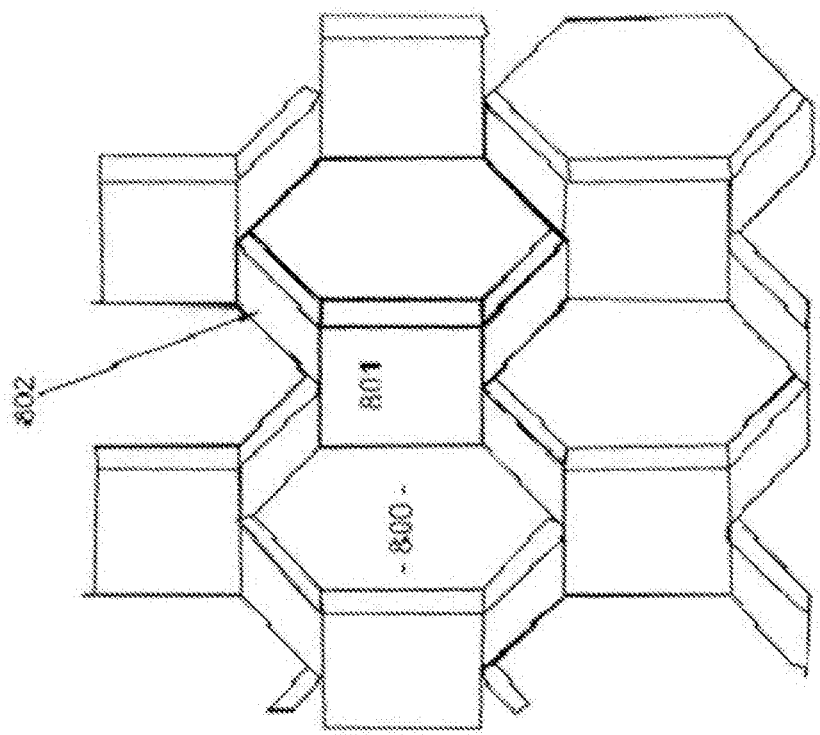
FIG. 5 is a top perspective view of one layer of expanded sheet material.

FIG. 5 is the top view of one layer of the slit sheet expanded to its three dimensional form with 800 being the open cell area created by the expansion, 801 being the lead wall or land created, and 802 being the connecting leg. It is noted that the terms lead wall and land are used interchangeably to indicate the region 801.

EXAMPLES

The first slit sheet pattern creates a 1/4" tall lead wall with each hexagonal side approximately being 3/16" long. The second slit sheet pattern is also 1/" tall by using the 1/8" row spacing. The legs of the cell are approximately 10 to 30% less or more to create an interlocking composite product. In this case the preferred size would be 0.4 slit×0.15" unslit creating a cell that will be 20% smaller than the first slit sheet pattern.

The second expanded slit sheet pattern creates a cell that easily could fit inside the first expanded slit sheet material but is inhibited by the increase in quantity of the smaller cell size causing 1.2 cells trying to fit within one cell of the first expanded sheet which, is impossible.

In order for the operator to receive both slit sheet expanded materials at the same speed a special expander is required. The first expanded sheet layer expands from 1" to approximately 2⅛" inches depending upon paper strength and thickness. In the present invention the 80 pound basis weight paper expands to the 2⅛" inches for the 1/2"×3/16" first slit sheet layer. This is an approximately 213% increase in the length of the slit sheet material and the expander will need create this exact expansion property for the first layer.

The second layer will be twenty percent smaller in size and therefore will expand 193% in length. Therefore the second expansion rollers within the expander machinery will have a reduced expansion ratio to accommodate this smaller amount of expansion. This reduced expansion ratio would therefore automatically reduce the smaller secondary web layer speed exiting from the expander. To maintain the same exiling speed for both layers the back rollers that set the overall exit speed will have to be adjusted to 20% faster for the second layer.

Additionally, slight variations in cell size, of 5 to 10%, can be opened with the same Velcro to rubber roller ratio as the larger cell size due to the slipping effect of the Velcro rollers. As the cell size grows the effect is minimized and either a larger cell is not opened fully for maximum benefit or a small cell shows tears or complete tearing of the slit sheet material.

With only a slight cell size variation the paper width does not have to be exact such that if one web is slightly wider by no more than 5 to 10% then the efficiency of wrapping is maintained. This would make the loading of the expander easier as the upper web could be the lower web and visa-versa and the only difference would be the cell size on the upper web may change from smaller to larger or visa-versa.

Two expanded slit sheets or layers of a single sheet with a tissue separator have a thickness that is theoretically 3/16"+3/16"=6/16" (0.375"), but has been measured to be 11/32" or 0.344". By way of contrast two interlocked layers of expanded sheet material, in accordance with the present invention measured at 3/16"+3/16" to produce a thickness of 5/16" or 0.3125". The loss of thickness of the two interlocked layers of expanded slit paper represents the amount of interlocking of the two adjacent, overlaid sheets of expanded slit paper of the present invention.

While this represents a 9% loss of thickness, it has been found that in use, the expanded slit sheets with a tissue separator tends to flatten due to the cells having limited rigidity under a load and has a tendency to retract. By way of contrast, the interlocking design of the present invention, as compared to the tissue separated design of the prior art, is more resistant to deformation under load, more resilient, and resists retraction. It has been found that in use, the design of the present invention produces a wrap that is thicker than the tissue separated design of the prior art, presumably because of its ability to retain its thickness, in contrast to the tissue separator configuration. The tissue separated design of the prior art, has been found to generally retain less than 75% of its expanded length, whereas the crisscross pattern of the present invention tends to retain greater than 75% of its fully expanded length.

In another 12 layers with zero nesting has a thickness of 2.25", were each expanded sheet layer has a thickness of 0.1875" (0.1875×12=2.25". example 12 layers have a thickness of about 2", representing a loss of thickness of about 11%. Thus, preferably, the nesting is limited to 10 to 20% and most preferably it is limited to 9 to 15%.

Blade Design

The use of a center bevel sharpened blade is well known for flatbed die cutting, where the downward pressure is absolutely vertical. The blade is supported on both sides of the sharpened edge versus a side bevel sharpening that produces a straight side and a wedge side. In the rotary die cutting process of the present invention, the side bevel blade rotates to the vertical and therefore, there is a time where it is impacting the paper prior to absolutely vertical. This adds a longitudinal pressure that can damage the blade. It has now been found that it is best if there is a bevel on both sides of the blade in the formation of expanded slit paper sheets.

However, the center bevel design limits the control of the cell direction as both sides of the blade are identical in wedge effect and therefore, can create inconsistent/erratic cell openings but on a less controlled basis. Previously, the center bevel blade of equal angles, as illustrated in FIG. 16 of U.S. patent application Ser. No. 14/480,319, blade 1600, created erratically opened cells in an uncontrolled pattern. The side bevel blades 1602 and 1604 of FIG. 16 had a short blade life when used in the formation of uniformly opening cells or erratically opening cells.

In accordance with some preferred embodiments of the present invention, there is a substantial improvement of the useful life of the slit forming blades that are employed to produce either uniformly or erratically opened cells in a controlled manner. This is achieved by constructing a wedge angle that is different on each side of the blade. The wider wedge will have the greater effect on the paper and therefore will open the cell in the desired direction dependent upon which direction it is facing. This design can create erratically opened cells on a row by row basis by alternating the forward or backward direction of the most pronounced wedge side of the blade and conversely, the blades can be oriented to always have the greatest wedge in only one direction to produce uniformly opened cells.

When the blades are oriented such that the rows of wider wedge all face forward, uniformly opened cells are created. If the blades are oriented such that the first row of blades face the wider wedge forward and the second row of blades face the wider wedge backward with each subsequent row alternating back and forth, then the cells are caused to open erratically. The first-row wedge effect will force the cells to open forward while the second row will force the cells to open backward and so on. Similarly, a random blade orientation can be used to produce a random, chaotic opening of cells.

In both instances, the instant art center bevel design is engineered to direct the cells where previously it was only feasible with a side bevel sharpened blade, as taught in U.S. application Ser. No. 14/480,319 filed Sep. 8, 2014.

FIG. 1 is a side view of a single blade of the new art, where blade 100 has a first wedge side 101 that has been sharpened to a specific acute angle 105 as it relates to the imaginary center line 107. Wedge side 102 is then sharpened to create a wider wedge angle 106 relative to the imaginary center line 107. Flat edge 103 is integrally joined to the tool and the rest of the cutting knives. Paper 104 is cut and forced into a wedge such that the pronounced wedge effect is on blade side 102.

Figure 2:
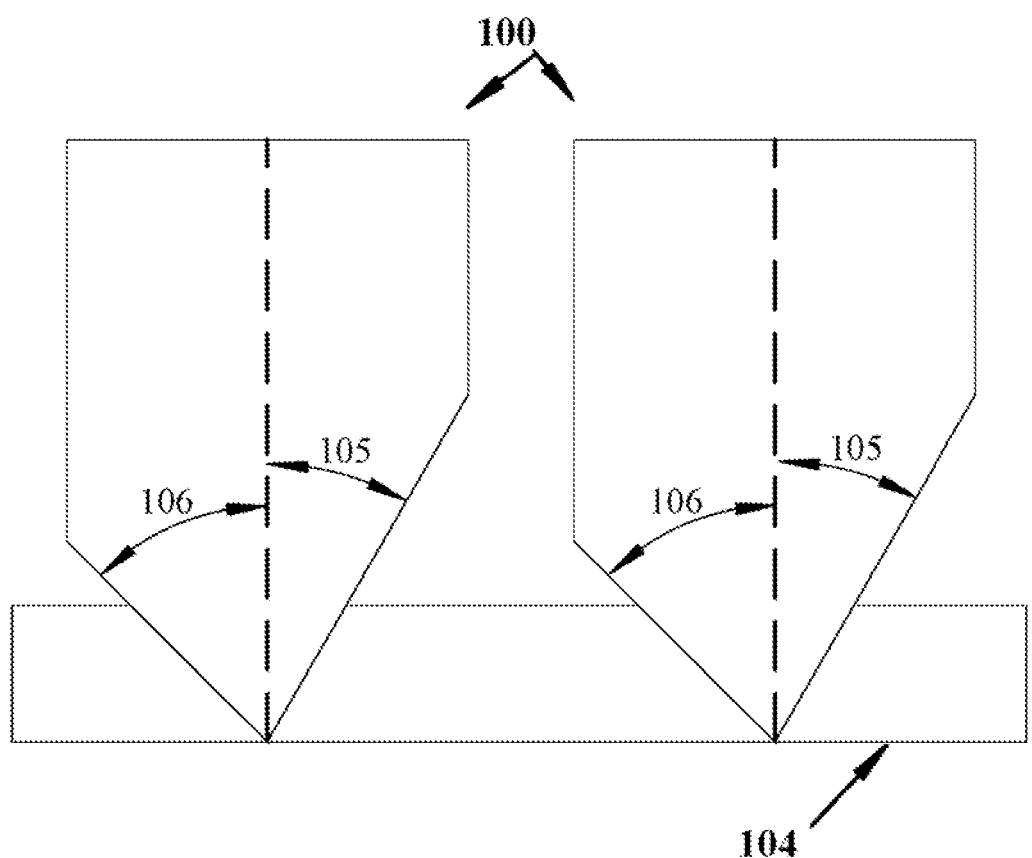
FIG. 2 is side view of the center bevel cutting blade oriented to produce uniformly opening cells.

FIG. 2 is a side view of the uniform blade configuration, where blades 100 have their respective acute wedge angles 105 facing to the right while the wider angle is facing to the left. This creates a consistent wedge effect onto paper 104 such that the paper will open uniformly.

Figure 3:
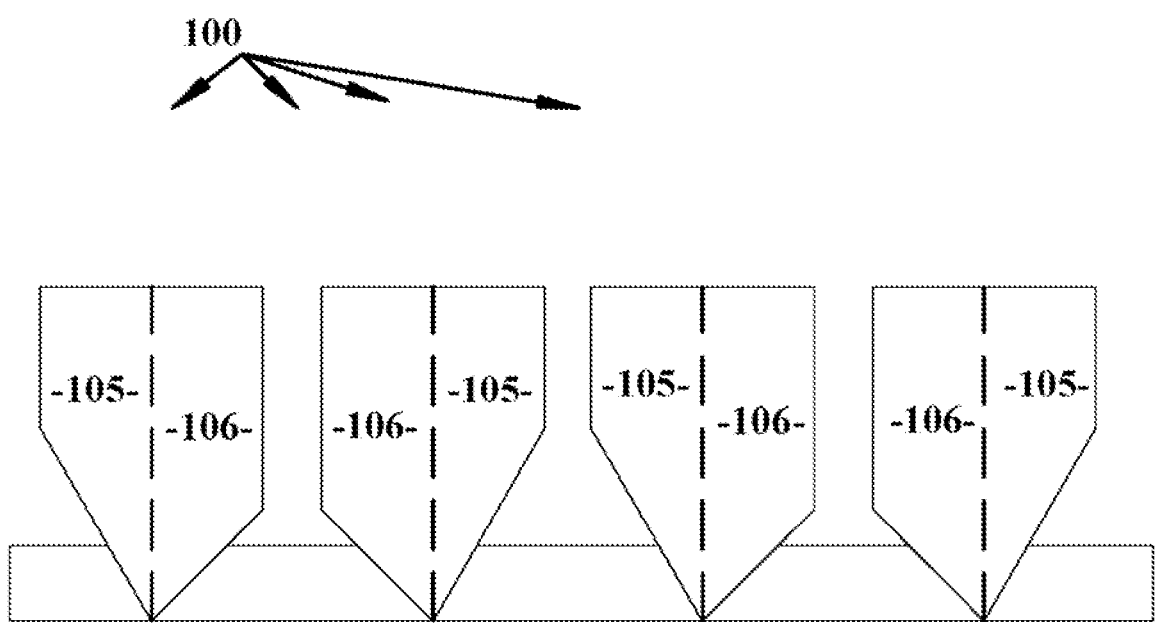
FIG. 3 is a side view of the center bevel cutting blade oriented to produce erratically opening cells.

FIG. 3 is a side view of the erratic blade configuration, where blades 100 have their respective wider wedge angles 106 facing each other and acute wedge angles 105 facing also facing each other. This blade configuration creates an alternating cell opening pattern, where each row desires to opening in the opposite direction of the previous direction.

Angle 106 is preferably in the range from about 40-50°, and angle 105 is preferably in the range from about 25-35° with respect to the center line 107 of blade 103. More preferably, angle 106 is in the range from about 40-45°, and angle 105 is in the range from 30-35°. Preferably, angles 105 and 106 differ by at least 10° and more preferably differ by at least 10° and most preferably, by at least 15°. Preferably, angle 105 is at least 25°.

All references, including publications, patent applications, and patents, cited herein are hereby incorporated by reference to the same extent as if each reference were individually and specifically indicated to be incorporated by reference and were set forth in its entirety herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus function or step plus-function limitations will only be employed where for a specific claim limitation all of the following conditions are present in that limitation; a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language "present invention" or "invention" should not be improperly interpreted as an identification of criticality, should not be improperly interpreted as applying across all aspects or embodiments (I.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example".

The use of the terms "a" and "an" and "the" and similar references in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein, including the best mode known to the inventors for practicing the claimed invention. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art.

As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value.

Also, the disclosure of ranges is intended as a continuous range including every value between the minimum and maximum values plus the broadening of the range afforded by the use of the term "about", "substantially", or "approximately". Thus, recitations of ranges of values herein are merely intended to serve as a shorthand method of referring individually to each separate value falling within the range, unless otherwise indicated herein, and each separate value is incorporated into the specification as if it were individually recited herein.

To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

The invention claimed is:

1. A method of producing a paper packaging product including a sheet of slit paper having a slit pattern, the slit pattern upon expansion forming cells that include land regions that are inclined with respect to a plane of an unexpanded sheet, the method comprising the steps of:
   slitting the sheet of slit paper,
   expanding the sheet of slit paper with said slits producing land regions that have angles of inclination in a range from 50 to 85 degrees from the plane of the unexpanded sheet, with said land regions alternating on a row by row basis in forward and backward directions such that the slit pattern upon expansion includes an alternating cell opening pattern wherein each row opens in an opposite direction from an adjacent row.

2. The method according to claim 1, further comprising the step of:
   forming the slit pattern by slitting with blades, and
   wherein the paper is recycled paper.

3. The method according to claim 2, wherein
   the blades have a first wedge angle on one side of the blades and a second wedge angle on the other side of the blades, wherein the first wedge angle is in the range from about 40 to 50 degrees, and the second wedge angle is in the range from about 25 to 35 degrees with respect to a center line of the blades.

4. The method according to claim, wherein
   wherein said sheet of slit paper is configured to form said land regions alternating on a row by row basis in forward and backward directions and said alternating cell opening pattern wherein each row opens in an opposite direction from an adjacent row by an operator expanding the sheet of slit paper with an expander.

5. The method according to claim 1, wherein
   said cell pattern includes an array of hexagonal cells.

6. The method according to claim 2, wherein
   said cell pattern includes an array of hexagonal cells.

7. The method according to claim 1, wherein said paper packaging product comprises two adjacent layers that nest less than 20%.

8. The method according to claim 7, wherein said paper packaging product comprises two adjacent layers that nest less than 10%.

9. The method according to claim 7, wherein a thickness of two adjacent layers is no less than 70% of twice the thickness of a single layer.

10. The method according to claim 7, wherein a thickness of two adjacent layers is no less than 80% of twice the thickness of a single layer.

11. An apparatus for producing a paper packaging product including a sheet of slit paper, the sheet of slit paper having a slit pattern, the slit pattern upon expansion forming cells that include land regions that are inclined with respect to a plane of an unexpanded sheet, the apparatus comprising:
    a slitter that slits the sheet of slit paper with a plurality of blades, which produce slits that upon expansion, produce land regions that have angles of inclination in a range from 50 to 85 degrees from the plane of the unexpanded sheet, with said land regions alternating on a row by row basis in forward and backward directions such that the slit pattern upon expansion includes an alternating cell opening pattern wherein each row opens in an opposite direction from an adjacent row.

12. The apparatus according to claim 11, further comprising:
    wherein the paper is recycled paper.

13. The apparatus according to claim 11, wherein
    the blades have a first wedge angle on one side of the blades and a second wedge angle on the other side of the blades, wherein the first wedge angle is in the range from about 40 to 50 degrees, and the second wedge angle is in the range from about 25 to 35 degrees with respect to a center line of the blades.

14. The apparatus according to claim 11, wherein
    said sheet of slit paper is configured to form said land regions alternating on a row by row basis in forward and backward directions and said alternating cell opening pattern wherein each row opens in an opposite direction from an adjacent row by an operator expanding the sheet of slit paper with an expander.

15. The apparatus according to claim 11, wherein said cell pattern includes an array of hexagonal cells.

16. The apparatus according to claim 11, wherein said cell pattern includes an array of hexagonal cells.

17. The apparatus according to claim 11, wherein said paper packaging product comprises two adjacent layers that nest less than 20%.

18. The apparatus for at least a pair of interlocking adjacent layers of a paper packaging product according to claim 11, wherein said paper packaging product comprises two adjacent layers that nest less than 10%.

19. The apparatus according to claim 11, wherein a thickness of two adjacent layers is no less than 70% of twice the thickness of a single layer.

20. The apparatus according to claim 11, wherein a thickness of two adjacent layers is no less than 80% of twice the thickness of a single layer.

21. A paper packaging product produced by the method of claim 1, comprising:
a sheet of slit paper having a slit pattern, the slit pattern upon expansion forming cells that include land regions that are inclined with respect to a plane of an unexpanded sheet;
the sheet of slit paper being configured such that expanding the sheet of slit paper with said slits produces land regions that have angles of inclination in a range from 50 to 85 degrees from the plane of the unexpanded sheet, with said land regions alternating on a row by row basis in forward and backward directions such that the slit pattern upon expansion includes an alternating cell opening pattern wherein each row opens in an opposite direction from an adjacent row.

22. A paper packaging product, comprising:
a sheet of slit paper having a slit pattern, the slit pattern upon expansion forming cells that include land regions that are inclined with respect to a plane of an unexpanded sheet;
the sheet of slit paper being configured such that expanding the sheet of slit paper with said slits produces land regions that have angles of inclination in a range from 50 to 85 degrees from the plane of the unexpanded sheet, with said land regions alternating on a row by row basis in forward and backward directions such that the slit pattern upon expansion includes an alternating cell opening pattern wherein each row opens in an opposite direction from an adjacent row.

\* \* \* \* \*